United States Patent [19]

Kronogård

[11] 4,070,825
[45] Jan. 31, 1978

[54] GAS TURBINE POWER PLANT

[75] Inventor: Sven-Olof Kronogård, Lomma, Sweden

[73] Assignee: United Turbine AB & Co., Sweden

[21] Appl. No.: 732,420

[22] Filed: Oct. 14, 1976

Related U.S. Application Data

[63] Continuation of Ser. No. 527,308, Nov. 26, 1974, abandoned.

[51] Int. Cl.² .............................................. F02C 7/10
[52] U.S. Cl. ................................. 60/39.51 R; 165/76
[58] Field of Search ...................... 60/39.51 R, 39.32; 165/76, 83; 285/226, 229, 261

[56] References Cited

U.S. PATENT DOCUMENTS

| | | | |
|---|---|---|---|
| 2,611,242 | 9/1952 | Bell | 60/39.51 R |
| 3,191,707 | 6/1965 | Peterson | 60/39.51 R |
| 3,434,532 | 3/1969 | Henricksson | 165/76 |
| 3,596,934 | 8/1971 | DeCenzo | 285/261 |
| 3,792,729 | 2/1974 | Penny | 165/76 |
| 3,822,741 | 7/1974 | Lippitsch | 165/83 |

*Primary Examiner*—Carlton R. Croyle
*Assistant Examiner*—L. J. Casaregola
*Attorney, Agent, or Firm*—Holman & Stern

[57] ABSTRACT

In order to obtain a compact and serviceable gas turbine plant including a compressor and a turbine rotating about a common axis and further having at least one combustion chamber and an air preheater, the turbine and the compressor are spaced apart axially to provide a space for mounting the combustion chamber or for the gas discharge, respectively. The air-preheater is divided into at least two box-shaped units, each unit including at least two individually mountable exchanger elements. The power take-off with the pertaining reduction gear is located at the compressor end of the plant, leaving the turbine and heat exchanger easily accessible for servicing.

9 Claims, 17 Drawing Figures

GAS TURBINE POWER PLANT

This is a continuation of application Ser. No. 527,308 filed Nov. 26, 1974 (abandoned).

BACKGROUND OF THE INVENTION

The present invention relates to gas turbine power plants. One object of the invention is to provide a compact design suitable for automotive purposes, in which the individual components are easily accessible for overhaul. A special consideration is here taken to the design and location of the air preheater.

SUMMARY OF THE INVENTION

A power plant, according to the invention, includes at least one compressor, at least one turbine, at least one combustion chamber and an preheater, which takes flow paths and available space into consideration and may be subdivided in different manners. The components mentioned are built together as a unit and the invention is characterized in that the compressor and the turbine rotate about a common axis and are axially spaced, with the combustion chamber is mounted in the space between the compressor and the turbine and being directed substantially radially inwards with respect to the axis of rotation and that the air preheater includes at least two box shaped units, unit being considerably longer and wider than it is deep, and each unit including at least two parallel separately mountable elements.

The air preheater batteries, which have a deciding influence upon the space requirements of the plant, may be shaped and arranged in many different ways, so it will be possible to adapt the plant to the space available in vehicles of different types. The individual elements of a battery are, according to a development of the invention, provided with means making it possible in a simple manner to mount and dismount the same, without any major dismounting of the plant having to be made.

DETAILED DESCRIPTION OF SOME PREFERRED EMBODIMENTS

Figure 1:
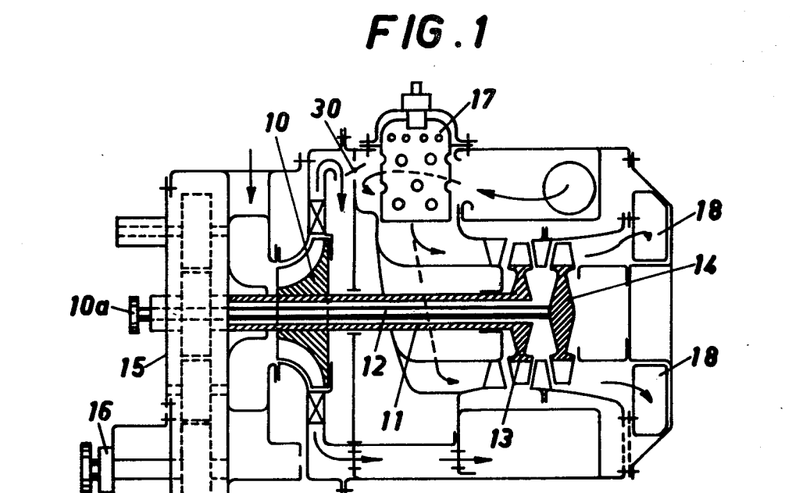
FIG. 1 is a vertical, longitudinal section through a plant according to the invention.
Figure 2:
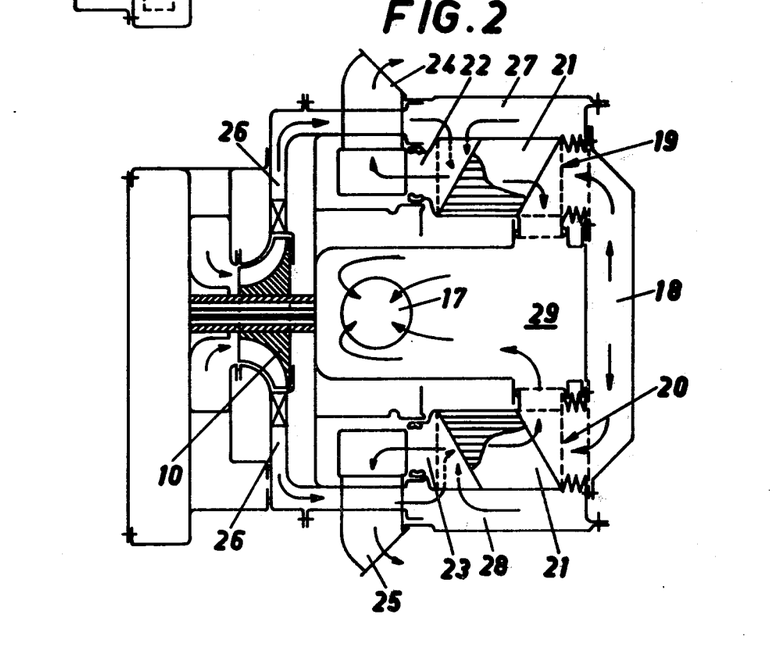
FIG. 2 is a horizontal, longitudinal section through the plant according to FIG. 1.
Figure 3:
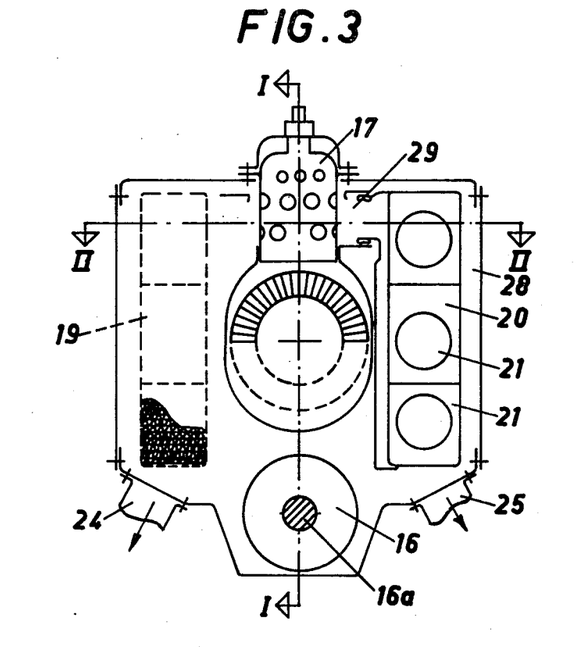
FIG. 3 is a cross section through the plant shown in FIG. 1, FIG. 4 schematically shows a plant according to the invention suitable for installation in a passenger car, FIG. 5 in a corresponding manner shows a plant suitable for installation in a truck.

The plant shown in FIGS. 1-3 includes a compressor 10, and two turbine rotors 13, 14 operating on concentric shafts 11 and 12. The shaft 11 of rotor 13 which is hollow carries the rotor of the compressor, and the two shafts 11, 12 are interconnected by a transmission 15 located at the compressor side of the plant.

The transmission 15 includes components, not described in detail, which reduce the turbine speed to a suitable value at a power take-off 16, and which also interconnects the two shafts 11, 12 in such a manner that the available power may be distributed, at will, to the compressor, to the power take-off or to auxiliaries 10a. The plant may include further turbine rotors not shown on the drawing.

The turbine rotors 13 and 14 are axially spaced a sufficient distance from the rotor of the compressor 10 to permit a combustion chamber 1, to be fitted between the compressor and the turbine rotors, and to be directed radially or tangentially inwards with respect to the common rotational axis for the compressor and the turbine with its inlet chamber.

The combustion gases are, downstream of the combustion chamber 17, deflected substantially about 90° and flow through the turbine rotors 13 and 14 to a collecting chamber 18 located at the end of the plant remote from the transmission 15.

Two air preheater batteries 19 and 20 are located between the collecting chamber 18 and the combustion chamber 17, one battery to each side of a vertical, longitudinal plane through the plant. Each battery is shaped as a box structure which is longer and wider than it is deep, and is composed of three separate elements 21 operating in parallel, and whenever possible interconnected as a unit.

The design of the elements 21 will be described more particularly in connection with FIGS. 9-15, and at present, it is sufficient to remember that there is a box shaped battery, arranged vertically, to each side of the axis of rotation, permitting the flow of exhaust gases and of air respectively through flow passages which are separated from each other.

As is evident from FIG. 2, the gases will flow from the collecting chamber 18 in two axial streams towards the compressor end of the plant through the elements 21. Downstream of each battery 19, 20, there is a collecting box 22 and 23, respectively, which are each connected to an exhaust conduit 24 and 25, respectively.

The air leaving the compressor is collected in a front section 26 and is conveyed along the turbines through passages 27, 28 close by the external walls of the plant (which thereby are kept cool) and further axially through the elements 21, in counterflow with respect to the combustion gases. The individual streams from the elements 21 are fed into a central collecting chamber 29, within which the inlet end of the combustion chamber 17 is located.

A passage having a throttle 30 is adapted to convey unpreheated air directly from the compressor to the inlet of the combustion chamber so the maximum temperature therein may be maintained at a suitable level. All components above described may, in this manner, be combined into a very compact unit, in which they still are easily accessible for overhaul.

Figure 4:
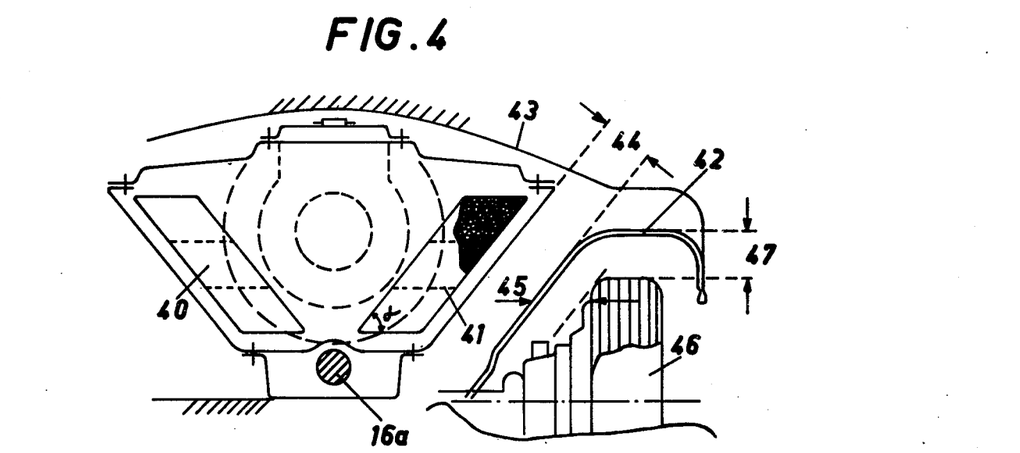

The cross section shown in FIG. 3 is well suited for mounting in vehicles of all types, as the available space has been reduced to a very high degree. FIG. 4 shows a cross section, which is suitable for passenger cars. The contours of the combustion chamber and of the compressor are shown in dotted lines. Two air preheater batteries 40 and 41 are arranged in the form of a V with the passages arranged horizontally and displaced sidewards with respect to each other. The branches of the V enclose the axis of rotation and its apex is turned downwards.

The engine space is laterally defined by a housing 42, for the wheels with their pertaining fenders, and upwards by an engine cover 43. For servicing, there must be a space 44 between the power plant and the wheel housing 42, one location of which will be determined by a space 45 required for steering wheels 46 as well as a space 47 required for permitting the activity of the springs.

Figure 5:
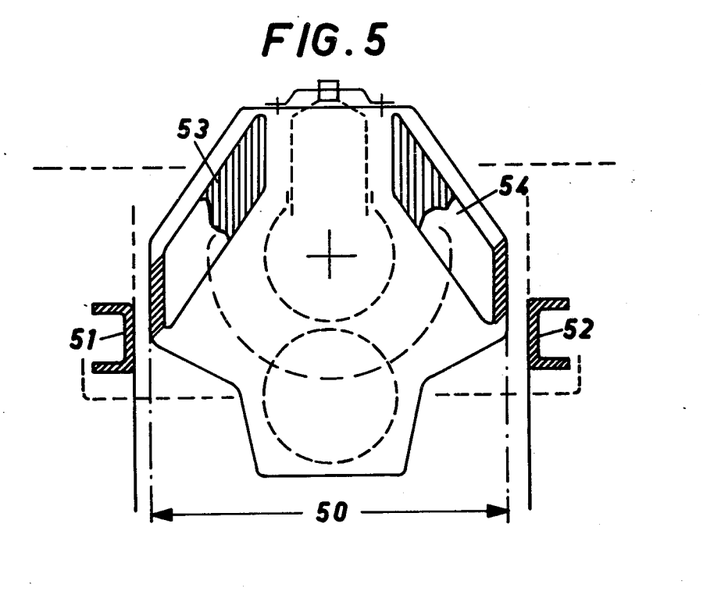

With a truck or bus (FIG. 5), the breadth of the engine space will be determined by a distance 50 between longitudinal beams 51, 52 of the chassis. Here it will be more advantageous to arrange two air preheater batteries 53, 54 in the form of an inverted V, having its apex above the axis of rotation.

Figure 6:
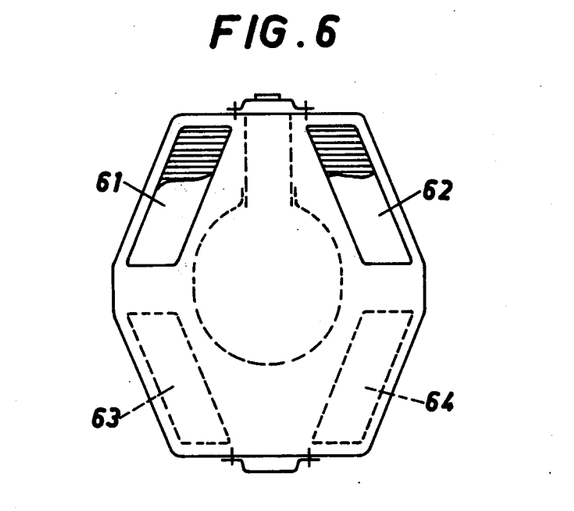
FIGS. 6, 7 and 8 show further modified embodiments suited to differently shaped engine spaces, FIG. 9 schematically shows the principle for the flow paths through the air preheater elements.

If the available space is very limited in the transverse direction it may, as is shown in FIG. 6, be advantageous to provide four air preheater batteries 61, 62, 63 and 64 arranged to form a V and an inverted V, respectively, enclosing the axis of rotation.

Figure 7:
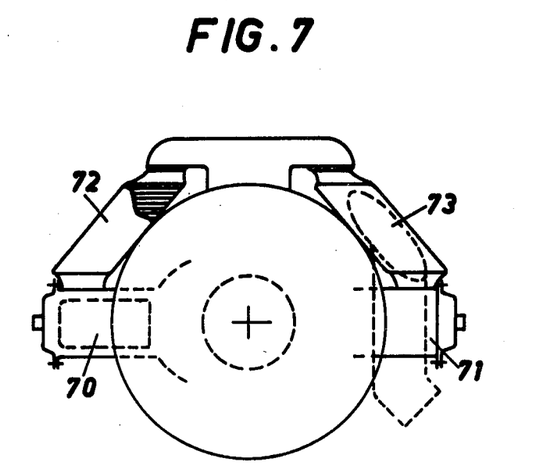

On occasions in which the available space is not restricted in the transverse direction, but it is desirable to keep the height of the plant down, it is, in the manner shown in FIG. 7, possible to arrange two combustion chambers 70, 71, diametrically opposite to each other in a horizontal plane through the axis of rotation, which two air preheater batteries 72, 73 being arranged to form an inverted V above said axis.

Figure 8:
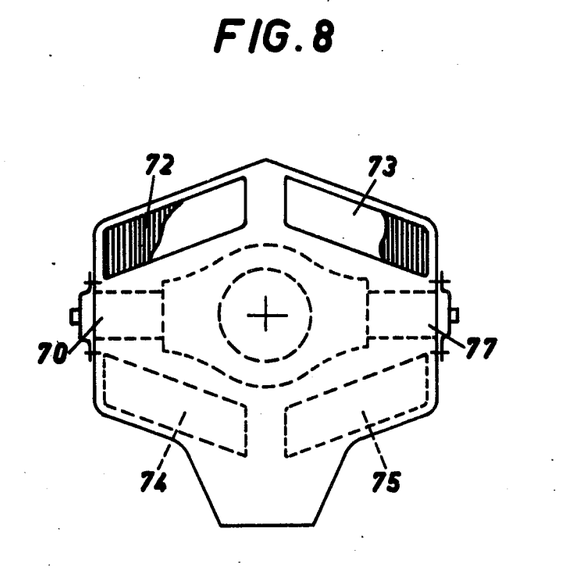

According to a further development of this invention, it is according to FIG. 8 possible, in addition to the batteries included in FIG. 7, to arrange two further batteries 74, 75 in V-form below the axis of rotation. The embodiments according to FIGS. 6 and 8 may be standardized to a single design, which permit the mounting in different ways with the combustion chamber plane turned 90°.

From the above, it is evident that the main components may be arranged in a number of ways and it will, of course, be possible, besides the arrangements shown, to form many other combinations for matching special requirements. It is further evident that the number of rotors within the compressor and the turbine, respectively, may vary according to the size of the plant, its intended use and the required power output, and that the number of combustion chambers, as well as the location thereof, i.e. horizontally, vertically or in V-form will be determined by the capacity of the plant.

Figure 9:
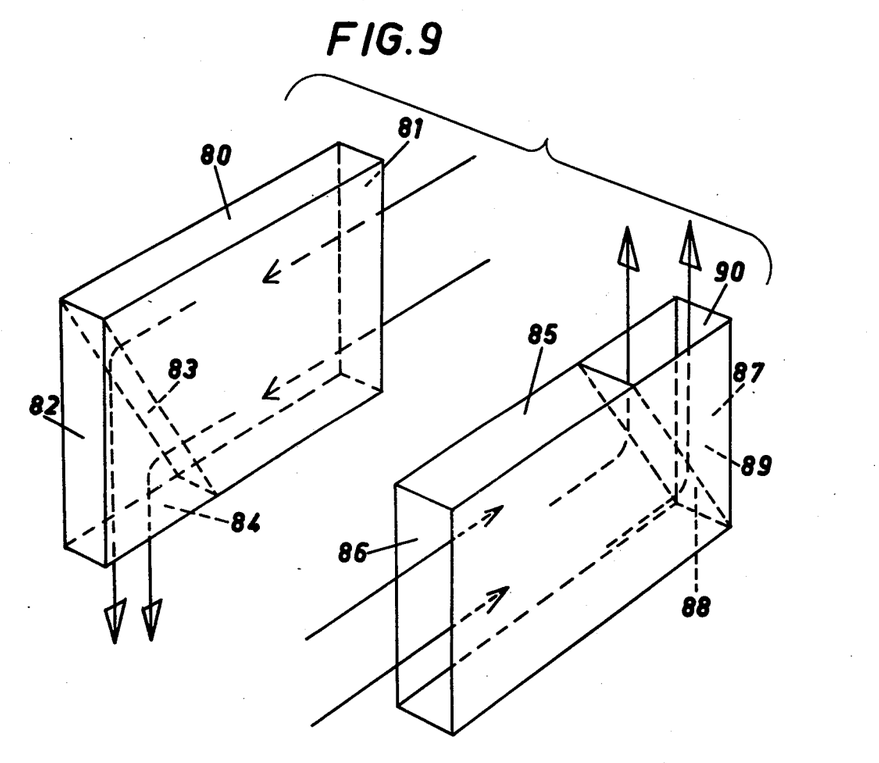

An air preheater of the type used here includes, as above mentioned, a plurality of passages for the two fluids, arranged in several superimposed parallel planes. The two fluids may pass through the preheater transversely to each other, but the flow may also occur as a part parallel counter flow, with one of the fluids being deflected 2×90°, or both fluids being deflected 1×90°. The principle is illustrated in FIG. 9, which shows two "slices" cut out from such a battery, the two "slices" in the drawing being displaced sidewards with respect to each other. Each "slice" is in reality composed of a number of parallel passages, which may be formed by each "slice" including a number of tubes, or be made of fluted material or in any other manner be subdivided by horizontal partitions.

A remote end 81 of a left "slice" 80 is open and one of the fluids, which may be the combustion gases, flows through the "slice" towards its opposite, closed end. The partitions dividing this "slice" into passages are cut along a plane 83 forming an angle with a plate 82 defining the end of the slice. Thus, a wedge formed space is formed, which communicates with an opening 84 in the lower wall of the "slice."

The second fluid, the air, is supposed to flow through the other "slice" by entering an adjacent end 86 of a right hand "slice" 85 and passing in counter flow to the fluid in the adjacent "slice" towards a remote, closed end 87 of the pertaining "slice."

Also in this, the ends of the partitions are obliquely cut at 88, so a wedge shaped space 89 is formed which communicates with an outlet 90 in the upper side wall of this "slice."

It is evident that a heat exchanger may be composed of a great many such "slices" arranged alternatingly according to type between front and rear distribution boxes with which the open ends 86 and 81 communicate, while a collecting box is arranged above, and a further collecting box is arranged below the preheater, communicating with openings 90 and 84 respectively, in the upper and in the lower side walls of the individual "slices."

FIG. 9 illustrates the basic function only, and the fluids may, as mentioned above, flow through the elements in many different ways. In FIG. 2, the intention is that the gas shall flow axially through the elements, while the air is deflected 2×90°.

The elements are preferably formed by fluted sheet material formed into "slices" separated by plane portion walls. With the embodiment according to FIG. 2, the passageway for the air will be noticebly shorter than that for the gas. This may be compensated for by making the flutes within the air "slices" deeper, so the heat emitting surface will have an optimal area with respect to the heat absorbing area.

When the batteries are arranged in V-form, such as is, for instance, shown in FIG. 4, the individual "slices" may be displaced in relation to each other within the pertaining element so a rhomboidal cross-section is obtained. Hence a far better utilization of the available space will be obtained, than has been possible hitherto.

The "slices" are thus not arranged perpendicularly with respect to the side walls of the battery, but are located parallel to a horizontal (or in FIG. 5 vertical) plane through the turbine axis. The rhombus angle preferably lies between about 45° and 60°.

Figure 10:
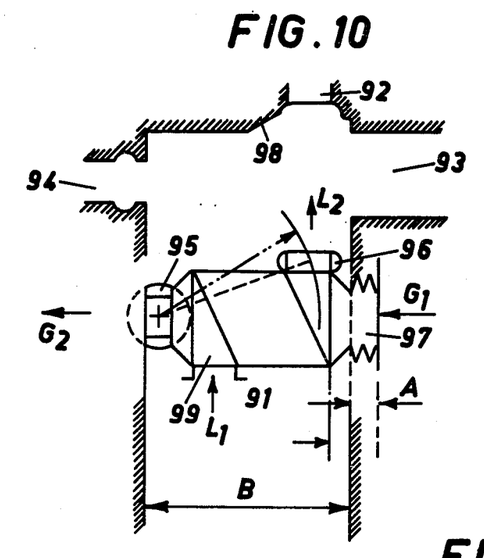
FIG. 10 shows an arrangement for fitting an air preheater element.

FIG. 10 shows a manner of fitting an element into a battery defined by narrow passages. The element is designed for Z-flow, i.e. basically as shown in FIG. 2.

It is presupposed that the air will be supplied through a distribution box 91, which is open downwards in order to permit the mounting. The air shall be conducted away through an upper opening 92. Gas will be supplied through an opening 93 and is conducted away through an opening 94.

For cooperation with the opening 94 the element is provided with a stud member 95, located at its left hand end, as shown in the drawing, with said stud member being formed and as part of a sphere. At its upper, right hand end, the element is provided with a corresponding stud member 95 for cooperation with the opening 92.

The right hand end of the element is formed as a compressible bellows 97 adapted to cooperate with the opening 93. It is possible to compress the bellows by a measure A, which is sufficient to reduce the length of the element during the fitting operation to correspond to a breadth B of the air distribution box 91. The element may thus be pushed inwards through the same.

The mouth of the opening 92 is widened at 98, which permits the right hand end of the element to be swung somewhat upwards, whereby the stud member 95 may be introduced into the opening 94, the mouth of which is formed to mate with the part spherical shape of the stud member. Thereafter, the element is brought back to a horizontal position and the bellows 97 is adjusted around opening 93.

An air inlet 99 is open downwards towards the air box 91, and it is not necessary to obtain a full sealing between the stud member 96 and opening 92 at the outlet of the air. The main thing is to obtain a good sealing at the entrance and the outlet, respectively, of the gas.

FIG. 10 shows a manner of fitting the elements only. As the batteries are arranged, for instance, in FIG. 2, the element will not be pushed vertically upwards, but horizontally inwards. The air box 91 in FIG. 10 will then correspond to box 28 in FIG. 2 and the stud member will be connected to the collecting chamber 29. The elements will thus be arranged above each other and may be individually mounted and dismounted.

Figure 11:
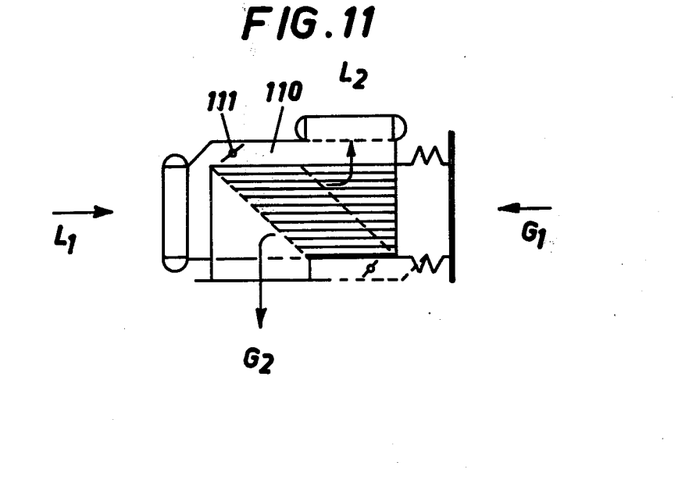
FIGS. 11, 12 and 13 show various elements having different flow paths for the air and for the gas, respectively.

FIG. 11 shows an element, in which the air as well as the gas are deflected 90° within the element. Air will enter at the left hand end of the element, as shown in the drawing and is conducted away from the top of the element.

A by-pass conduit 110 provided with a throttle 111 permits an adjusted amount of air to be conveyed directly to the outlet for mixing with the preheated air. Hence, it is possible to maintain a desired temperature of the air supplied to the combustion chamber.

Figure 12:
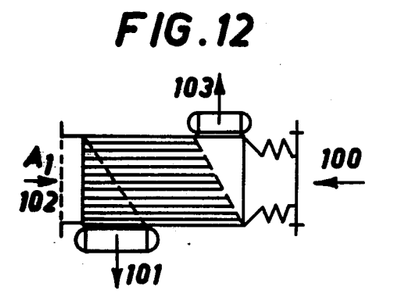
Figure 13:
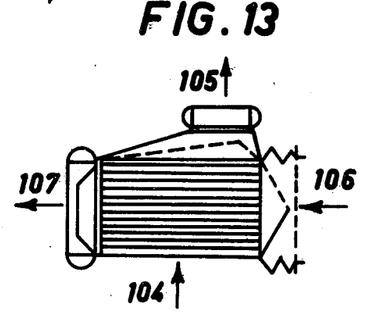

FIGS. 12 and 13 show further embodiments, and FIG. 12 corresponds to the arrangement schematically shown in FIG. 9. The gas (G) will enter at 100, and will leave the element at 101, while the air (L) will enter at 102 and leave the element at 103.

The element, according to FIG. 13, is arranged for pure cross flow. The air will enter at 104 and will flow out at 105 after having passed the element vertically, while the gas passes horizontally from 106 to 107.

Figure 14:
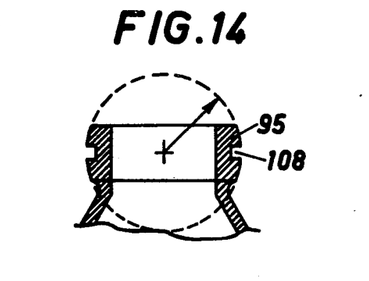
FIGS. 14 and 15 show details of the fitting members at the air preheater elements.
Figure 15:
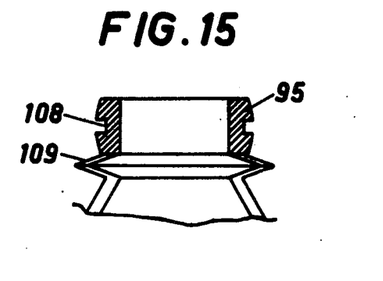

FIGS. 14 and 15 show some suitable shapes of stud members 95. The stud members per se is formed as a "slice" of a sphere cut symmetrically with respect to a middle plane therethrough, and is provided with at least one circumferencial groove 108 for a packing or other sealing member.

Figure 16:
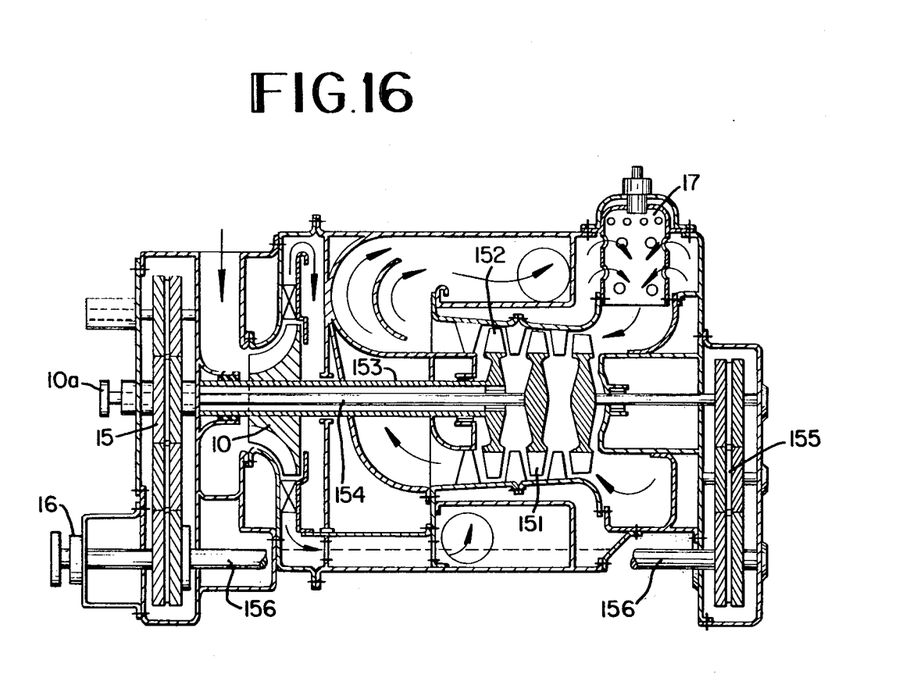
FIGS. 16 and 17 show a three spool version in views corresponding to those of FIGS. 1 and 2.
Figure 17:
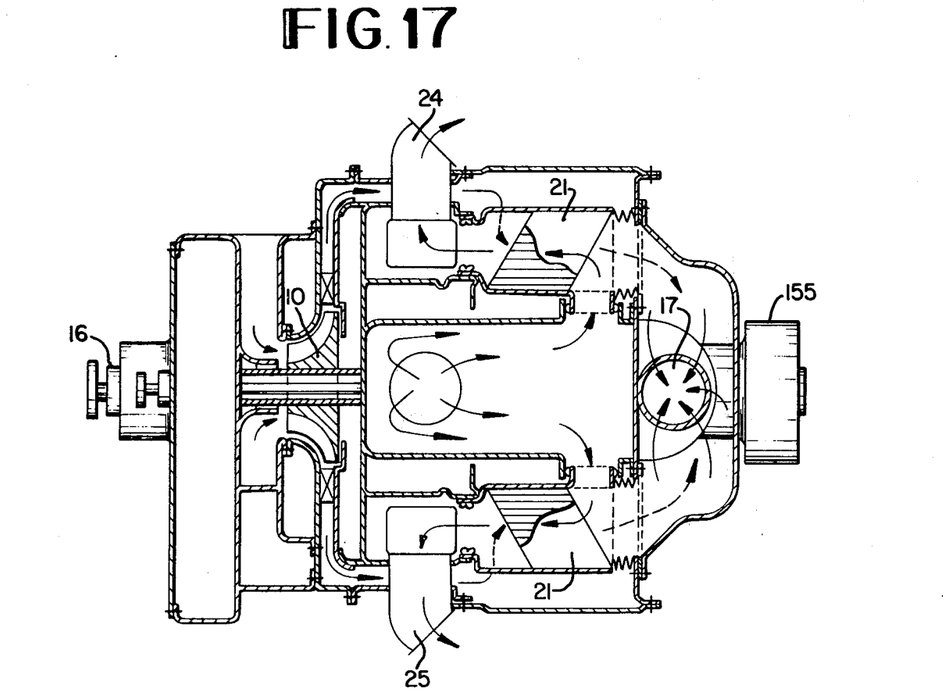

In order to facilitate the mounting and for compensating temperature movements, the head of the stud member 95 may be mounted upon a bellows 109 in the manner shown in FIG. 15. FIGS. 16 and 17 show a modified embodiment of the plant described in connection with FIGS. 1 and 2.

The general arrangement is the same, but the plant includes three rotors 150, 151 and 152 and the combustion chamber 17 is located at the end of the plant remote from the power takeoff 16.

The rotor 152 is mounted upon a hollow shaft 153 and drives the compressor 10, but is, by way of a variable transmission, connected to the gear train 15. The rotor 151 is mounted upon shaft 154 extending axially inside of the shaft 153 and likewise connected to the gear train 15.

The third rotor 150 is, by way of a gear train 155 and a shaft 156, connected to the gear train 15. Variable transmission means (not shown) may be arranged to transfer power from the rotor 150 to the compressor 10.

In the present embodiment, the outlet diffuser is arranged between the turbine and the compressor. In a plant including rotors 151 and 152 only the combustion chamber may be arranged axially with respect to the rotors.

The location of, and passagways to and from the heat exchanger 21 is substantially the same as in FIGS. 1 and 2, taking the location of the combustion chamber into consideration.

Further modifications and detail designs are, of course, possible within the scope of the appended claims and it is evident that the number of elements in each battery will vary according to the requirements. By building together a number of elements side by side, the battery structure will obtain a greater length and width than height. The elements may, in addition as sheet material, be manufactured from ceramic material ($Si_3$, $N_4$ or something similar) and be sintered to a complete package with a cover enclosing the passages. Possible elastic elements are formed as separate units made of metal basically as described above and are enclosed in the cover.

What I claim is:

1. A gas turbine power plant including: (a) a compressor part having a rotational axis; (b) a turbine part operating on the same rotational axis as the compressor part, but being axially-spaced therefrom and means forming a radial passageway for combustion gases between said compressor part and said turbine part, said turbine part being designed for axial flow and having an inward end adjacent to said radial passageway and an outward end remote therefrom; (c) at least one combustion chamber for supplying combustion gases to said turbine part; (d) airpreheating means for preheating combustion air between said compressor part and said at least one combustion chamber by means of combustion gases leaving said turbine part; (e) a common housing enclosing said compressor part, said turbine part and said air-preheating means; and (f) a power take-off from the power plant located at the compressor part end of the housing, said air-preheating means including at least two box-shaped units, located to opposite sides of said turbine part extending about from its inward end to its outward end and presenting an inward face towards said turbine part, and turning an outward face away therefrom, each of said units comprising at least two, heat exchange elements, arranged for parallel flow, distribution and collecting means at the axial ends of said elements as well as at the inward and outward faces thereof, said distribution and collecting means being defined by transverse end walls and inward axial walls, said walls being provided with fluid conductive sockets to individually and removably receive said elements, and each of said elements having a hollow stud and socket connector part at one axial end and an expandible bellows connector part at its opposite axial end, and further a stud and socket connector part at its inward face.

2. The gas turbine power plant according to claim 1, in which said at least one combustion chamber is located in the radial passageway so as to be accessible from the outside between said turbine part and said compressor part.

3. The gas turbine power plant according to claim 1, in which said at least one combustion chamber is located at the end of the housing remote from said power take-off, and an outlet diffusor is arranged in the radial passageway between said turbine part and said compressor part.

4. The gas turbine power plant according to claim 1, in which said at least one combustion chamber is located in the upper part of a vertical plant including said common rotational axis, the air preheater including at least two box-shaped units arranged to form a V enclosing said common rotational axis.

5. The gas turbine power plant according to claim 1, in which said at least one combustion chamber is located in the upper part of a vertical plane including said common rotational axis, the air preheater including four box-shaped units arranged to form a lozenge-shaped pattern enclosing said common rotational axis, two units being located below, and two units being located above the rotational axis.

6. The gas turbine power plant according to claim 1, including two combustion chambers located diametrically opposite each other in a horizontal plane including said common rotational axis, the air preheater including two box-shaped units, mounted to form an inverted V enclosing said common rotational axis, and fitted above the rotational axis.

7. The gas turbine power plant according to claim 1, including two combustion chambers located diametrically opposite each other in a horizontal plane including said common rotational axis, the air preheater including four box-shaped units mounted to form a V and an inverted V enclosing said common rotational axis and located one below and one above the rotational axis.

8. The gas turbine power plant according to claim 1, in which the stud and socket connector part at one axial end of each heat exchanger element is a hollow stud comprising a portion of a sphere, said stud being provided with at least one peripheral groove for reception of a sealing member.

9. The gas turbine power plant according to claim 8, in which said stud member is mounted upon an elastic, bellows shaped member.

* * * * *